(12) United States Patent
Johnson et al.

(10) Patent No.: US 9,878,643 B2
(45) Date of Patent: Jan. 30, 2018

(54) JUVENILE VEHICLE SEAT WITH HEADREST ADJUSTOR

(71) Applicant: Dorel Juvenile Group, Inc., Foxboro, MA (US)

(72) Inventors: Jason H Johnson, Brownstown, IN (US); Kyle M Franke, Columbus, IN (US); Sean R Denbo, Columbus, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 0 days.

(21) Appl. No.: 15/205,704

(22) Filed: Jul. 8, 2016

(65) Prior Publication Data

US 2017/0008429 A1 Jan. 12, 2017

Related U.S. Application Data

(60) Provisional application No. 62/190,881, filed on Jul. 10, 2015.

(30) Foreign Application Priority Data

Nov. 16, 2015 (CN) .................... 2015 2 0911384 U

(51) Int. Cl.
*B60N 2/28* (2006.01)

(52) U.S. Cl.
CPC ......... *B60N 2/2851* (2013.01); *B60N 2/2872* (2013.01)

(58) Field of Classification Search
CPC ........................... B60N 2/2851; B60N 2/2872
USPC ...................................................... 297/250.1
See application file for complete search history.

(56) References Cited

U.S. PATENT DOCUMENTS

| | | | |
|---|---|---|---|
| 6,623,074 B2 | 9/2003 | Asbach et al. | |
| 7,021,710 B2 | 4/2006 | Kain et al. | |
| 7,055,903 B2 | 6/2006 | Balensiefer et al. | |
| 7,246,852 B2 | 7/2007 | Balensiefer | |
| 7,669,926 B2 | 3/2010 | Balensiefer | |
| 8,579,369 B2 | 11/2013 | Gaudreau et al. | |
| 8,632,127 B2* | 1/2014 | Brunick | B60N 2/2812 297/250.1 |
| 8,764,108 B2 | 7/2014 | Gaudreau | |
| 9,022,471 B2 | 5/2015 | Gaudreau | |
| 2012/0261960 A1 | 10/2012 | Heisey et al. | |

* cited by examiner

*Primary Examiner* — Anthony D Barfield
(74) *Attorney, Agent, or Firm* — Barnes & Thornburg LLP

(57) ABSTRACT

A child restraint includes a juvenile vehicle seat and a headrest. The headrest is mounted for up-and-down movement on a seat back included in the juvenile vehicle seat. A releasable lock is provided to retain the headrest in more than one selected position on the seat back.

16 Claims, 11 Drawing Sheets

JUVENILE VEHICLE SEAT WITH HEADREST ADJUSTOR

PRIORITY CLAIM

This application claims priority to U.S. Provisional Application No. 62/190,881, filed Jul. 10, 2015, and Chinese Utility Model Application No. 201520911384.2, filed Nov. 16, 2015, each of which is expressly incorporated by reference herein in its entirety.

BACKGROUND

The present disclosure relates to seats for use by juveniles in vehicles, and, particularly, to seats having headrests that can be moved up and down relative to a seat back to assume a selected raised or lowered position. More particularly, the present disclosure relates to a juvenile vehicle seat including a headrest-position adjustment mechanism.

SUMMARY

According to the present disclosure, a child restraint includes a juvenile vehicle seat having a seat bottom and a seat back and a headrest mounted for up-and-down movement relative to the seat back. In illustrative embodiments, the child restraint includes a headrest-height adjustor that is coupled to the headrest to move up and down with the headrest relative to the seat back of the juvenile vehicle seat. The headrest-height adjustor is configured to be changeable by a caregiver between a headrest-locked mode engaging the seat back to prevent the headrest from moving up and down relative to the seat back and a headrest-unlocked mode to allow the headrest to move up and down relative to the seat back.

In illustrative embodiments, a caregiver needs to use only one hand to change the headrest-height adjustor from the headrest-locked mode to the headrest-unlocked mode so that the headrest is released and can be moved up or down on the seat back easily. A spring-loaded actuation button included in the headrest-height adjustor is mounted on the headrest for pivotable movement by the caregiver relative to the headrest about a substantially horizontal pivot axis using only one hand to change the headrest-height adjustor from the headrest-locked mode to the headrest-unlocked mode. A caregiver can easily grip a top portion of the headrest with the palm of one hand and apply a force to a front face of the actuation button that is visible and accessible through a forward-facing aperture formed in the headrest using the fingers of that same hand to pivot the actuation button about the horizontal pivot axis so as to compress a button-biasing spring also included in the headrest-height adjustor. By pivoting the actuation button about the horizontal pivot axis from a spring-biased normal position to a pivoted position, a headrest-lock linkage coupled to the actuation button and included in the headrest-height adjustor is moved relative to the seat back from a headrest-locked engaged position to a headrest-unlocked disengaged position to cause the headrest-height adjustor to be changed from the headrest-locked mode to the headrest-unlocked mode to free the headrest for up-and-down movement relative to the seat back. The button-biasing spring can be arranged to act, for example, between the headrest and the headrest-lock linkage coupled to the actuation button or between the headrest and the actuation button.

In illustrative embodiments, the headrest-lock linkage of the headrest-height adjustor includes a headrest-motion blocker comprising a horizontally extending blocker bar arranged to engage and disengage the seat back and a blocker-bar mover comprising a vertically extending rotatable bar-mover rod. The rotatable bar-mover rod has a lower portion coupled to the blocker bar of the headrest-motion blocker and an upper portion coupled to the pivotable actuation button. The blocker bar is engaged to the seat back when the headrest-lock linkage is in the headrest-locked engaged position. The blocker bar is disengaged from the seat back when the headrest-lock linkage is in the headrest-unlocked position.

In illustrative embodiments, the blocker bar of headrest-motion blocker is arranged to face toward the seat back and is spring-biased to move normally toward the seat back to engage one of several horizontal headrest-height slots formed in the seat back when the headrest-lock linkage is moved to assume the headrest-locked engaged position to fix the headrest in a stationary position on the seat back to establish the height of the headrest relative to the seat bottom. The spring-biased blocker bar can be moved away from the seat back using the blocker-bar mover to disengage the headrest-height slots when the headrest-lock linkage is moved to assume the headrest-unlocked disengaged position to free the headrest for up-and-down movement on the seat back.

In illustrative embodiments, the rotatable bar-mover rod of the blocker-bar mover is mounted on the headrest for rotation about a substantially vertical rotation axis to cause the lower portion of the bar-mover rod to engage the blocker bar of the headrest-motion blocker. Rotation of the rotatable bar-mover rod about the vertical rotation axis causes the spring-biased blocker bar to move horizontally away from the seat back and out of a companion horizontal height-adjust slot to disengage the seat back and establish the headrest-unlocked mode of the headrest-height adjustor so that the caregiver can move the headrest up and down relative to the seat back and therefor change the height of the headrest relative to the seat bottom.

In accordance with illustrative embodiments of the present disclosure, the pivotable actuation button can be pivoted about the horizontal pivot axis by a caregiver using only one hand to move relative to the headrest and cause the headrest-lock linkage to move to the headrest-unlocked disengaged position in which the spring-biased blocker bar of the headrest-motion blocker is moved away from the seat back to disengage one of the horizontal height-adjust slots. In operation, a rotation-inducing torque is applied to the upper portion of the rotatable bar-mover rod in response to pivoting movement of the pivotable actuation button about the horizontal pivot axis to cause the rotatable bar-mover rod to rotate about its vertical rotation axis and apply a disengagement force to the blocker bar of the headrest-motion blocker sufficient to move the blocker bar away from the seat back to disengage one of the headrest-height slots formed in the seat back so that the headrest is free to be moved up or down on the seat back by the caregiver to a raised or lowered height.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint in accordance with the present disclosure showing that a child restraint includes (1) a juvenile vehicle seat having a seat bottom and a seat back extending upwardly from a rear portion of the seat bottom, (2) a headrest mounted for up-and-down movement on the seat back, and (3) a headrest-height adjustor coupled to the headrest to move therewith and configured to include a pivotable actuation button mounted to be accessed by a caregiver from the front of the seat back and pivoted about a horizontal pivot axis by a caregiver using only one hand to unlock the normally locked headrest-height adjustor so that the headrest is free to be moved upwardly or downwardly on the seat back to assume a raised or lowered position on the seat back;

FIG. 2 is an assembly view showing a head-restraint unit comprising the movable headrest and the headrest-height adjustor separated from the juvenile vehicle seat and showing that the seat back is formed to include an upright center bar-anchor strip formed to include a series of vertically spaced apart, rearwardly opening headrest-height slots that are sized to engage a blocker bar included in a headrest-motion blocker;

FIG. 3 is a rear view of the juvenile vehicle seat and the head-restraint unit of FIG. 2 showing provision of complementary left and right bar-anchor strips flanking the center bar-anchor strip and showing formation of five headrest-height slots in each of the three bar-anchor strips included in the seat back and showing that the headrest-motion blocker of the headrest-height adjustor includes a horizontally extending blocker bar that is sized to be extended into each of the headrest-height slots formed in the seat back to establish a headrest-locked mode of the headrest-height adjustor;

FIG. 4 is an exploded perspective assembly view of components included in the movable headrest shown in FIG. 1 and a headrest-height adjustor associated with the movable headrest and configured to be used by a caregiver to establish the height of the headrest relative to the seat back included in the juvenile seat and showing that an upper portion of the seat back is formed to include a forward-facing aperture (seen from a rear side) and suggesting that the headrest-height adjuster comprises a pivotable actuation button adapted for pivotable movement on the headrest about a horizontal pivot axis and a headrest-lock linkage including a headrest-motion blocker comprising a spring-loaded movable blocker bar adapted to engage and disengage the seat back and a blocker-bar mover including two blocker-motion rods that are arranged to interconnect the pivotable actuation button and the headrest-motion blocker as suggested in FIGS. 5 and 7 and provide means for disengaging the spring-loaded movable blocker bar of the headrest-motion blocker from the seat back in response to pivoting movement of the pivotable actuation button about the horizontal pivot axis as suggested in FIGS. 11 and 12;

Figure 5:
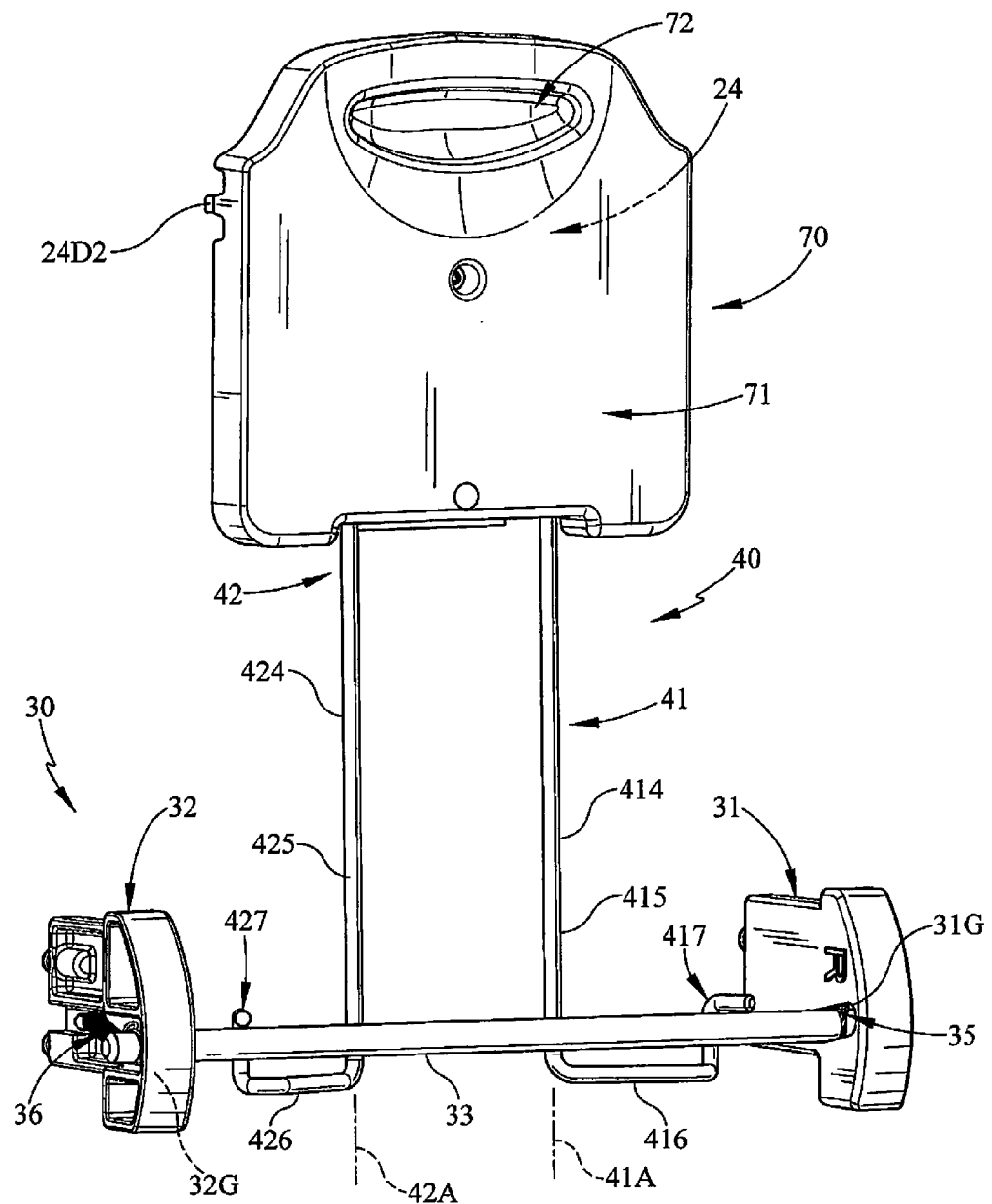
FIG. 5 is an enlarged rear view of a subassembly showing engagement of lower portions of the rotatable first and second blocker-motion rods included in the blocker-bar mover with a blocker bar included in the headrest-motion blocker and sized to fit into each of the headrest-height slots formed in three bar-anchor strips of the seat back as suggested in FIG. 3.
Figure 7:
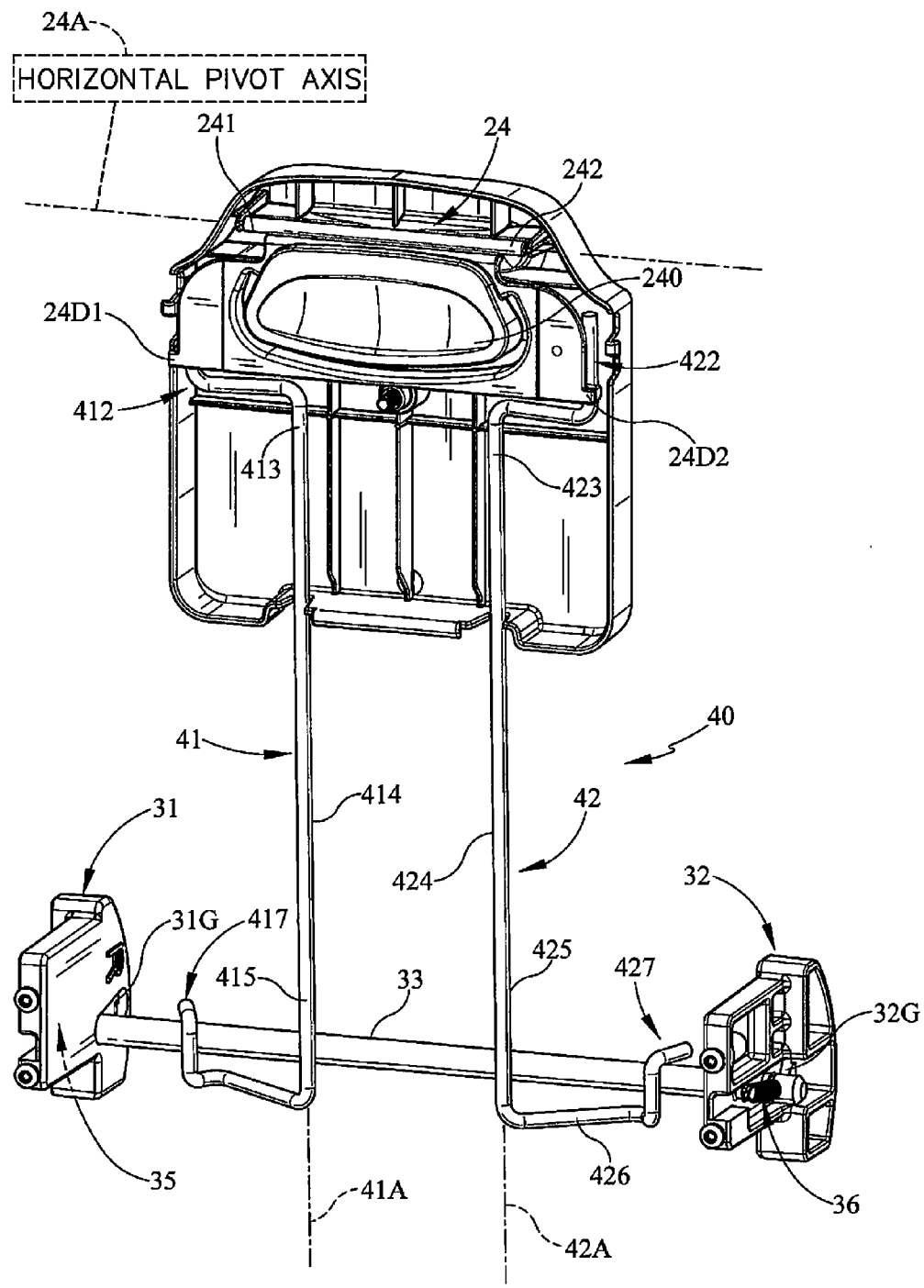
Figure 8:
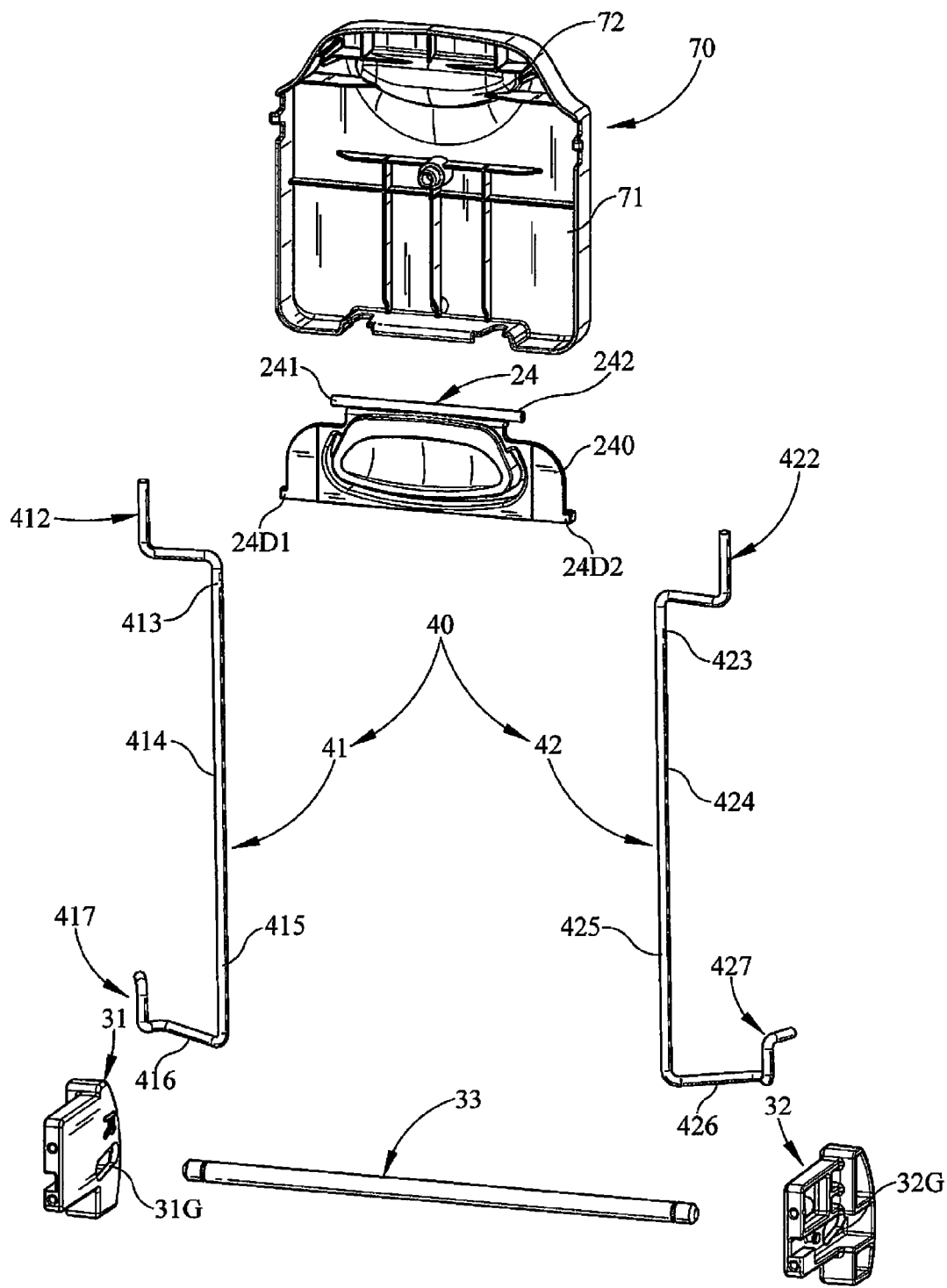
Figure 9:
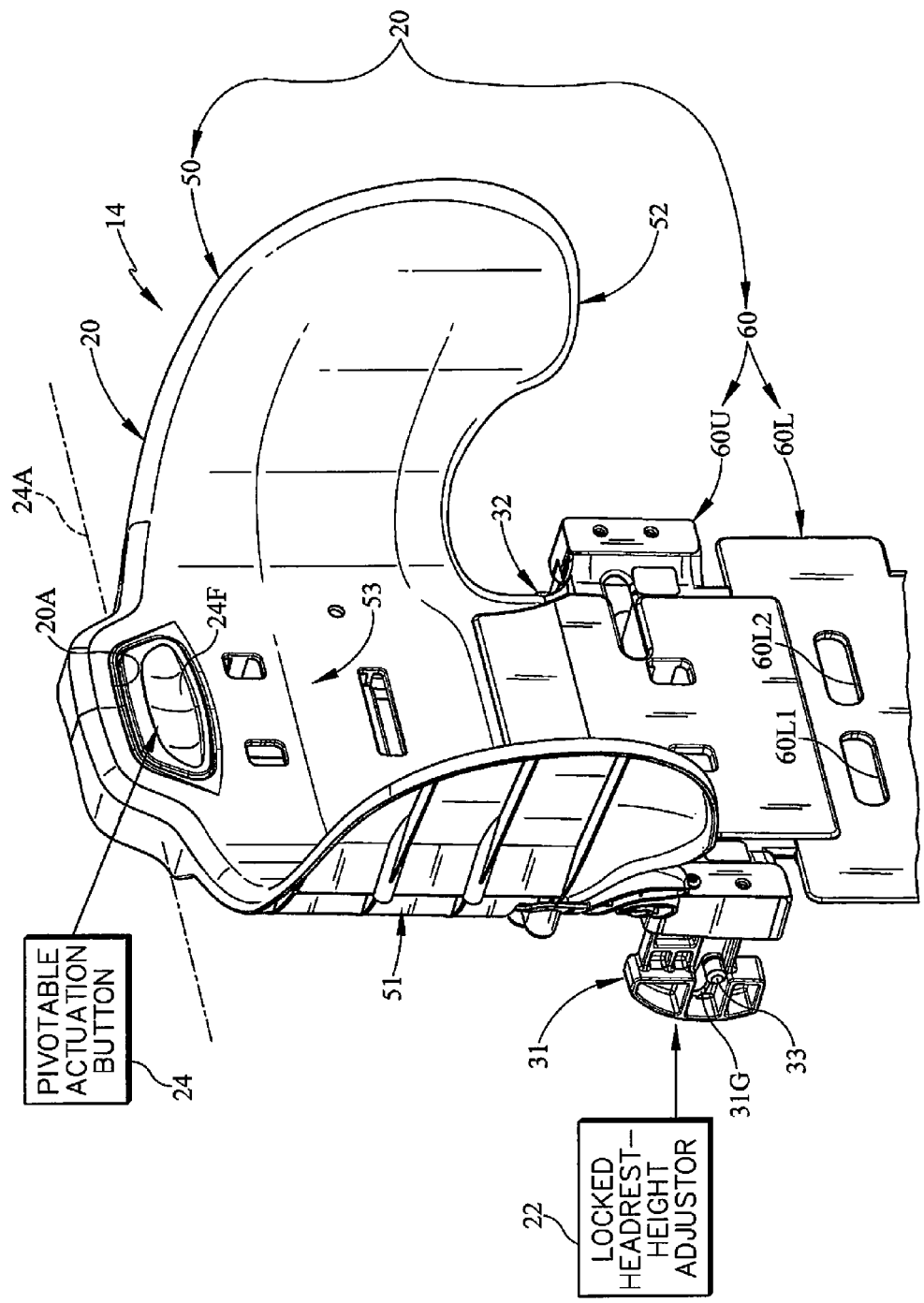
Figure 10:
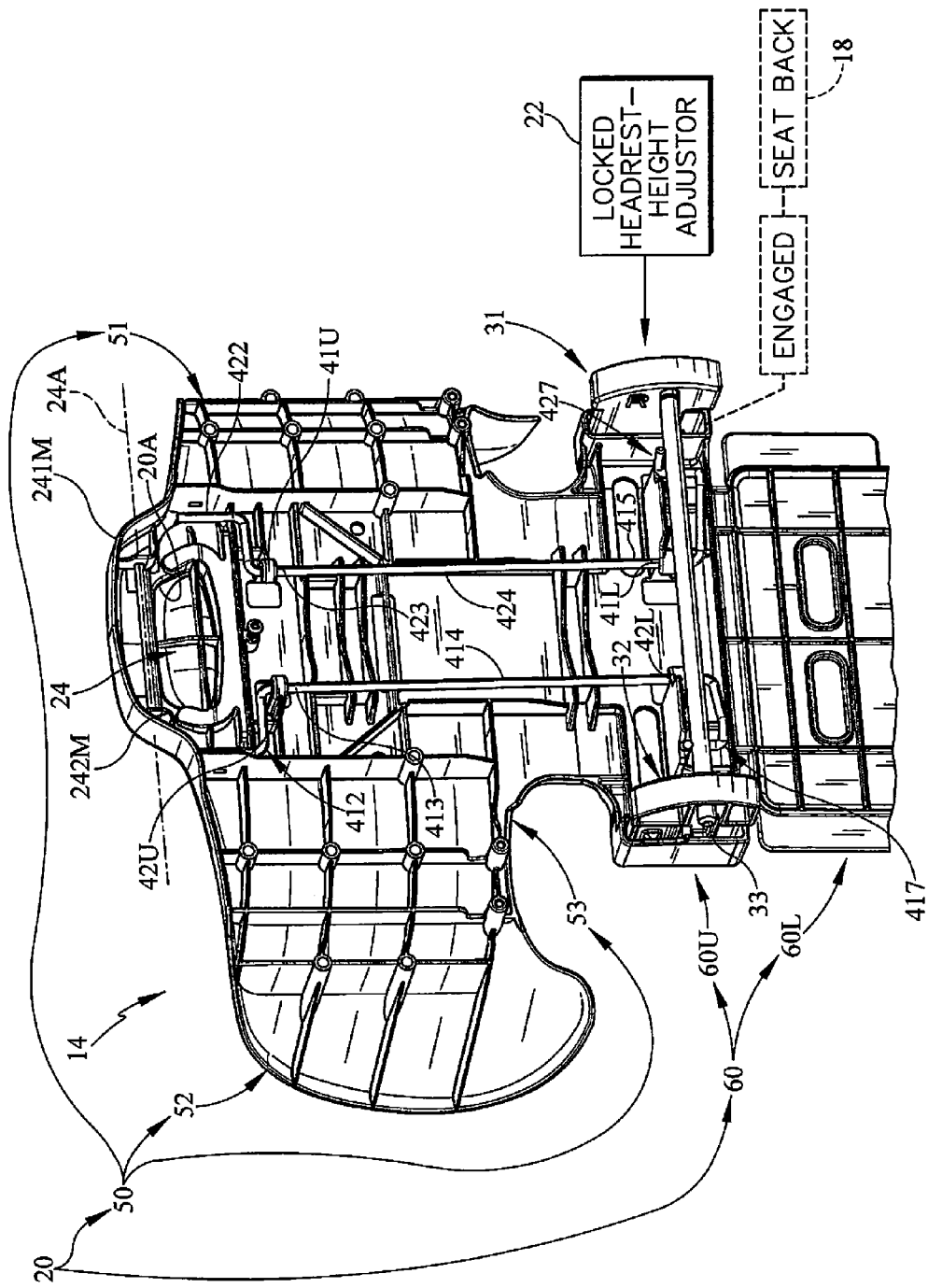
Figure 11:
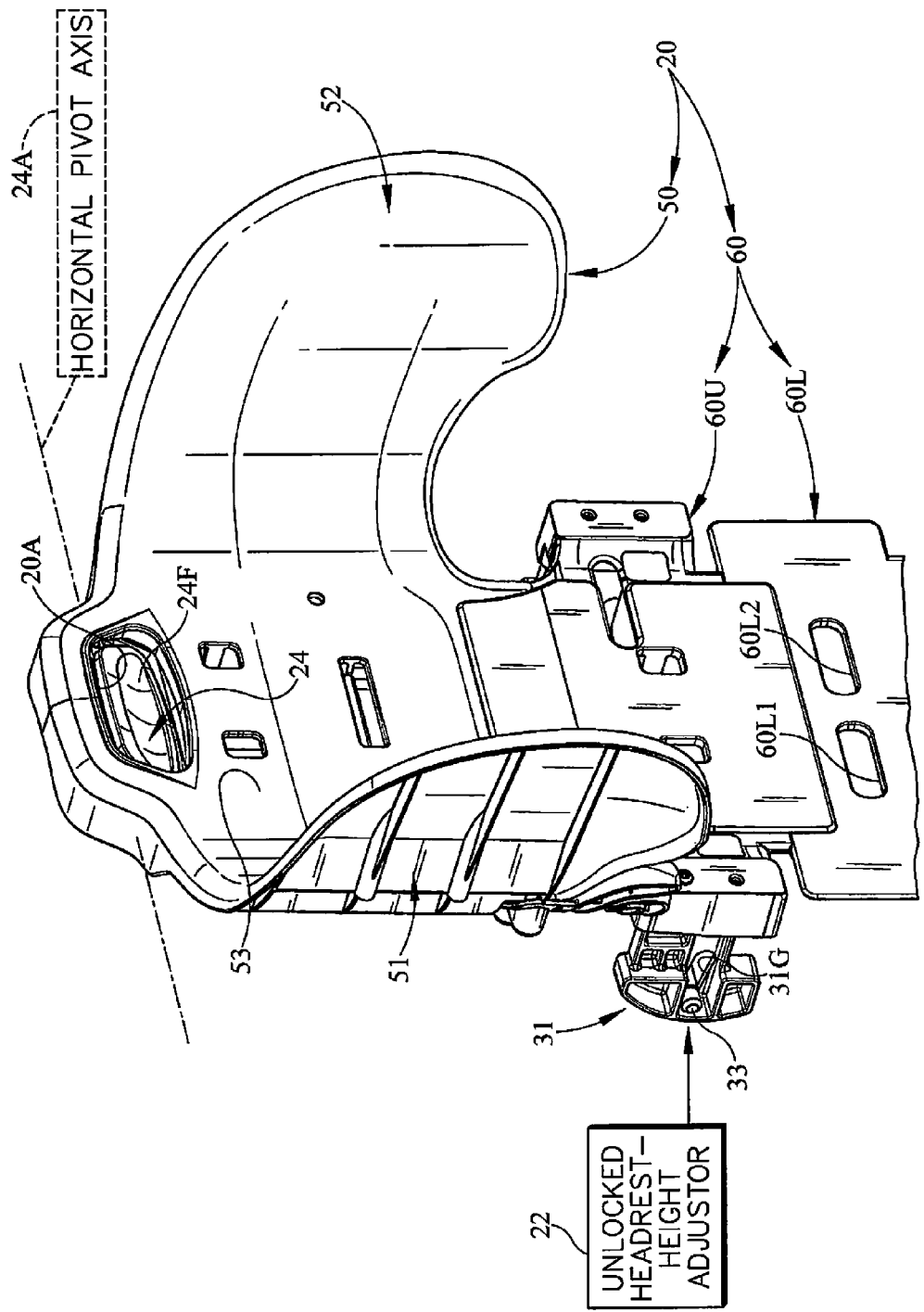
Figure 12:
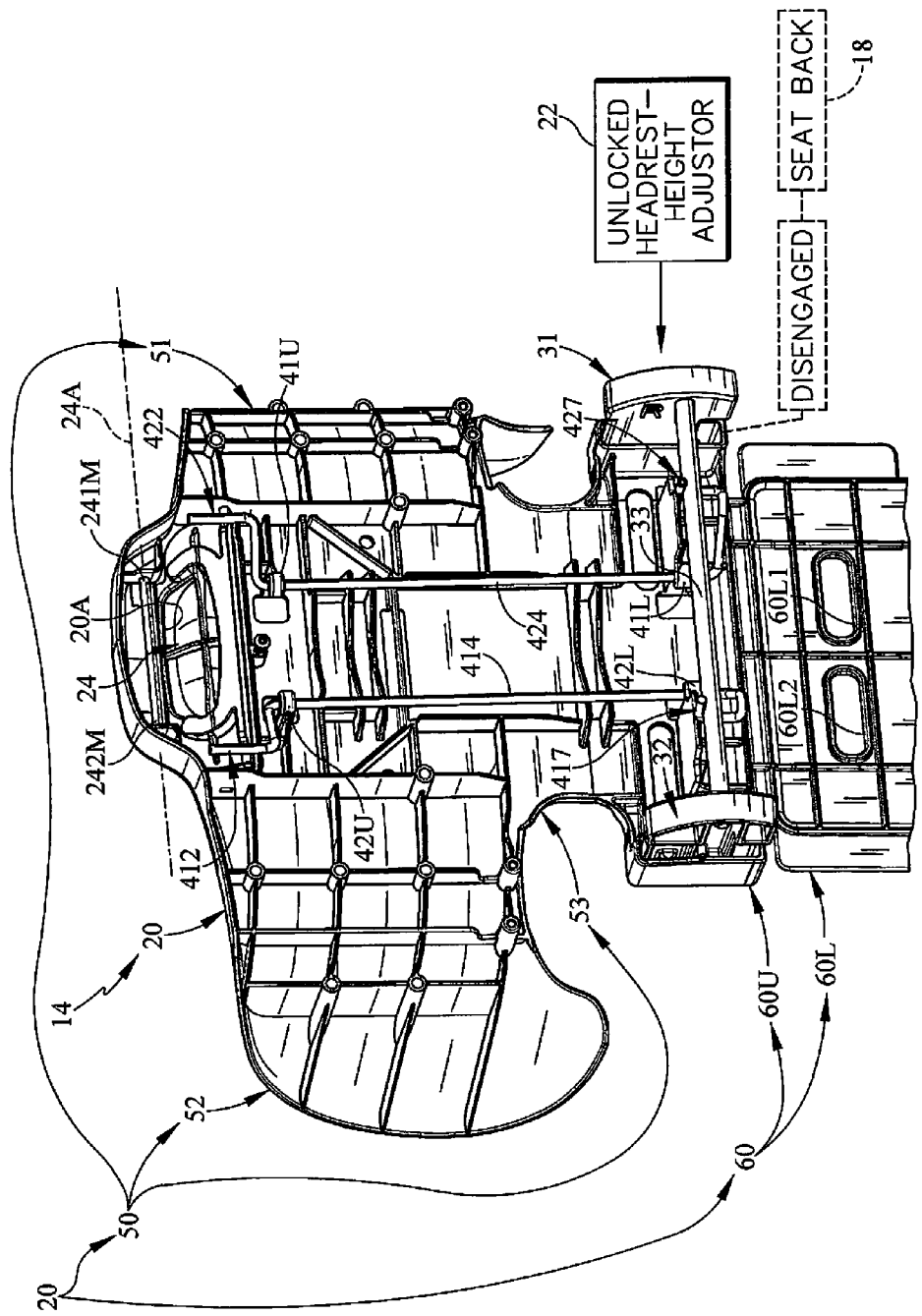

FIG. 7 is a front view of the subassembly of FIG. 5 showing engagement of upper portions of the rotatable first and second blocker-motion rods included in the blocker-bar mover with the pivotable actuator button and illustrating the horizontal pivot axis of the pivotable actuator button and showing that each of the blocker-motion rods includes an L-shaped torque receiver mating with a portion of the pivotable actuation button and an inverted L-shaped blocker-bar driver mating with a portion of the blocker bar included in the headrest-motion blocker;

FIG. 8 is an exploded assembly view of components shown in FIG. 7;

FIG. 9 is an enlarged front perspective view of a portion of the head-restraint unit showing the pivotable actuation button in a normal HOME position and the blocker bar of the headrest-motion blocker is spring-biased to extend into one of the headrest-height slots formed in the three bar-anchor strips included in the seat back (and shown in FIG. 3) to establish the headrest-locked mode of the headrest-height adjustor to block up-and-down movement of the headrest on the seat back;

FIG. 10 is a rear perspective view of the head-restraint unit of FIG. 9 showing the pivotable actuation button in the normal HOME position and suggesting that the blocker bar of the headrest-motion blocker is engaged to the seat back to establish the headrest-locked mode of the headrest-height adjustor;

FIG. 11 is a view similar to FIG. 9 showing the pivotable actuation button after it has been pivoted in a rearward direction about the horizontal pivot axis to assume a temporary ACTIVATED position to establish the headrest-unlocked mode of the headrest-height adjustor; and FIG. 12 is a rear perspective view of the head-restraint unit of FIG. 11 showing the pivotable actuation button in the temporary ACTIVATED position and suggesting that the actuation button has applied torque to the L-shaped torque receivers of each of the rotatable first and second blocker-motion rods to rotate those rods in opposite directions about companion vertical rotation axes to cause the L-shaped blocker-bar drivers included in lower portions of the blocker-motion rods to apply a disengagement force to the blocker bar of the headrest-motion blocker to disengage the blocker bar from the headrest-height slots formed in the seat back to establish the headrest-unlocked mode of the headrest-height adjustor.

DETAILED DESCRIPTION

Figure 1:
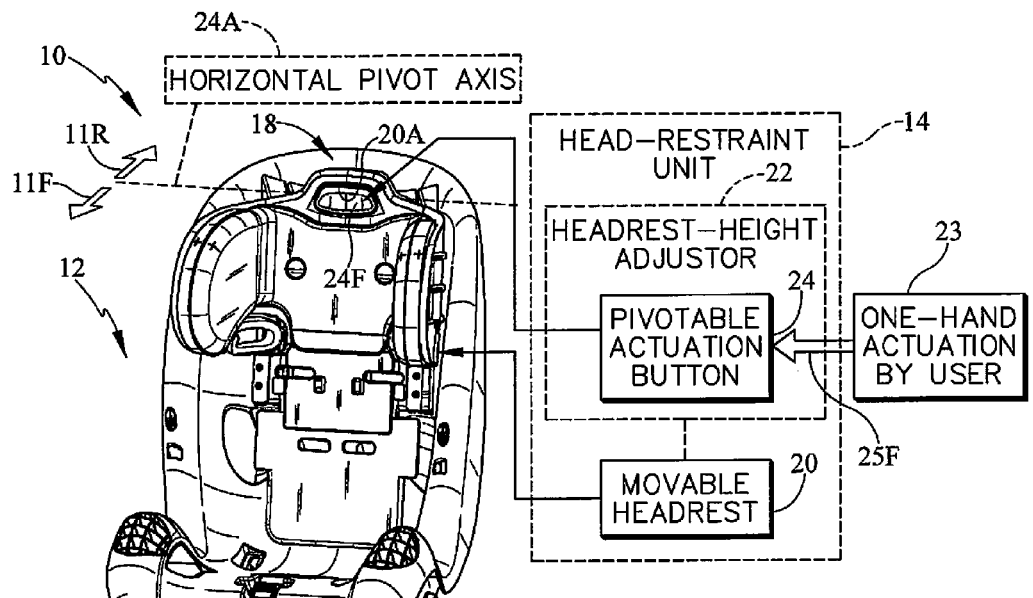
Figure 2:
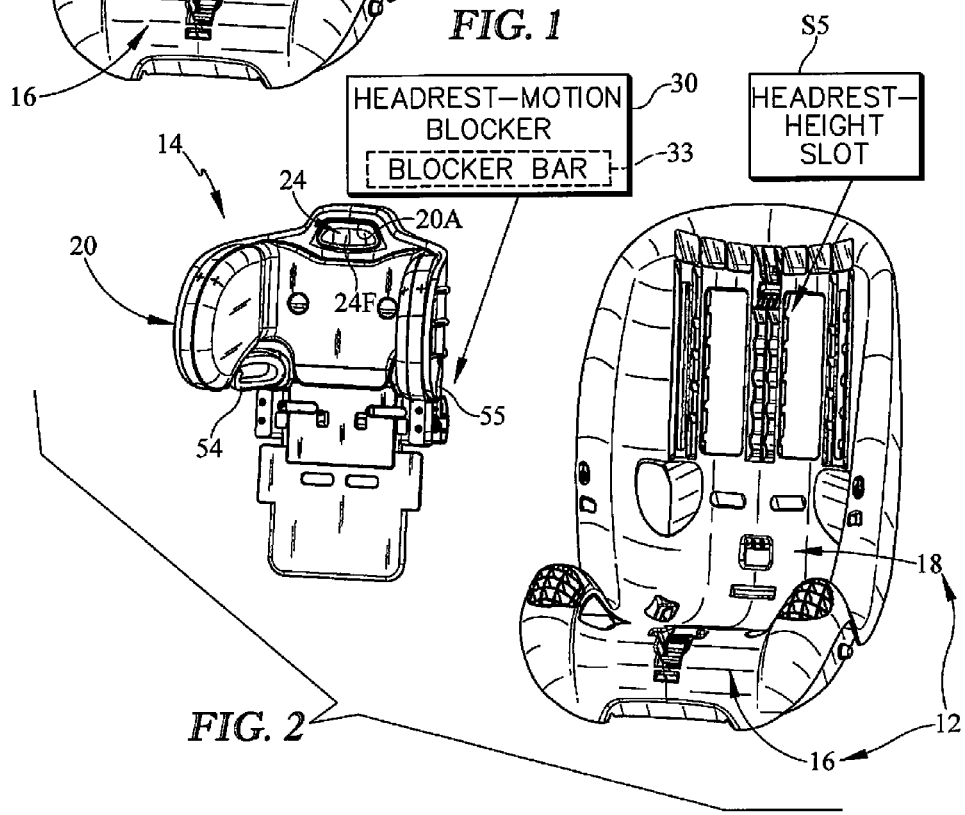

A child restraint 10 is shown in FIGS. 1 and 2 and includes a juvenile vehicle seat 12 and a head-restraint unit 14. Juvenile vehicle seat 12 includes a seat bottom 16 and a seat back 18 arranged to extend upwardly from a rear edge of seat button 14. Seat bottom 16 extends in a forward direction 11F away from seat back 16. Head-restraint unit 14 includes a headrest 20 that is mounted for up-and-down movement on seat back 18 of juvenile vehicle seat 12. Headrest 20 is formed to include a forward-facing aperture 20A as suggested in FIGS. 1, 2, 4, and 9.

A headrest-height adjustor 22 also included in head-restraint unit 14 includes a pivotable actuation button 24 that is mounted on headrest 20 for movement about a horizontal pivot axis 24A under the one-handed control of a caregiver 23 from a HOME position shown, for example, in FIGS. 1, 2, 9, and 10 to an ACTIVATED position shown, for example, in FIGS. 11 and 12 to unlock the headrest-height adjustor 22 so that the headrest 20 is free to be moved up and down on the seat back 18 by the caregiver 23 to a new elevation above the seat bottom 16. Caregiver 23 functions as an EXTERNAL FORCE GENERATOR and applies a motion-inducing force 23F to a front face 24F of pivotable actuation button 24 that is exposed in a forward-facing, forward opening aperture 20A formed in headrest 20 as suggested diagrammatically in FIG. 1.

Headrest-height adjustor 22 also includes a headrest-lock linkage 26 that is coupled to headrest 20 to move up and down with the headrest 20 on seat back 18. Headrest-lock linkage 26 is also coupled to the pivotable actuation button 24 so that the headrest-lock linkage 26 moves relative to seat back 18 in response to rearward pivoting movement of the pivotable actuation button 24 about the horizontal pivot axis 24A caused by application of motion-inducing forced 23F in a rearward direction 11R to front face 24A of actuation button 24. Headrest-lock linkage 26 is configured to engage and disengage seat back 18 in response to pivoting movement of pivotable actuation button 24 about horizontal pivot axis 24A. Headrest-lock linkage 26 is movable from a HEADREST-LOCKED ENGAGED position engaging seat back 18 to block up-and-down movement of headrest 20 on seat back 18 to a HEADREST-UNLOCKED DISENGAGED position disengaging seat back 18 to allow up-and-down movement of headrest 20 on seat back 18.

Figure 4:
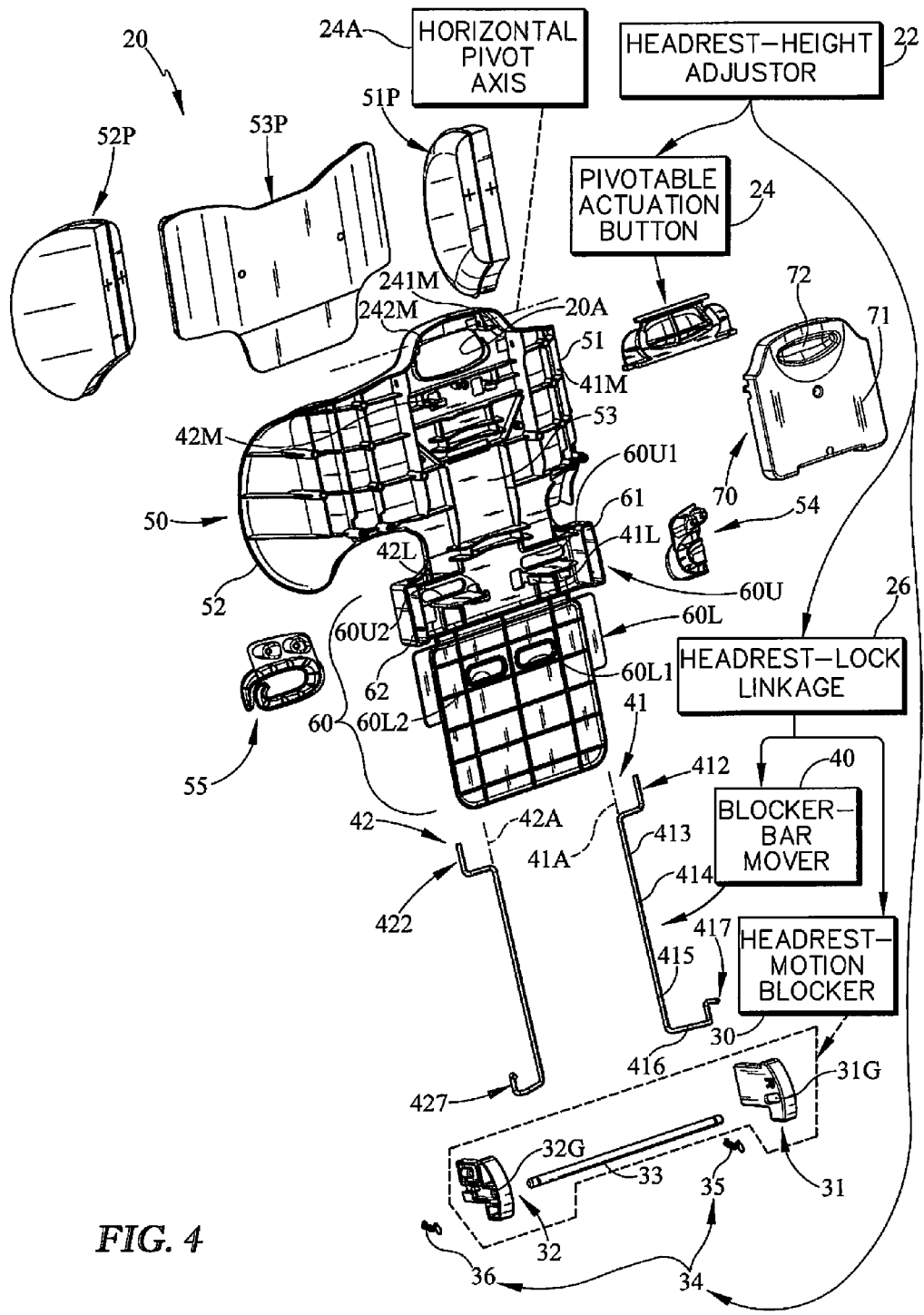

A headrest-motion blocker 30 is included in headrest-lock linkage 26 of headrest-height adjustor 22 as suggested FIGS. 2 and 4. Headrest-motion blocker 30 includes a first and second blocker-bar supports 31, 32, a blocker bar 33, and a spring system 34 comprising first and second springs 35, 36 as suggested in FIG. 4. First spring 35 is associated with a first end of blocker bar 33 and with first blocker-bar support 31. Second spring 36 is associated with a second end of blocker bar 33 and with first blocker-bar support 32.

Figure 3:
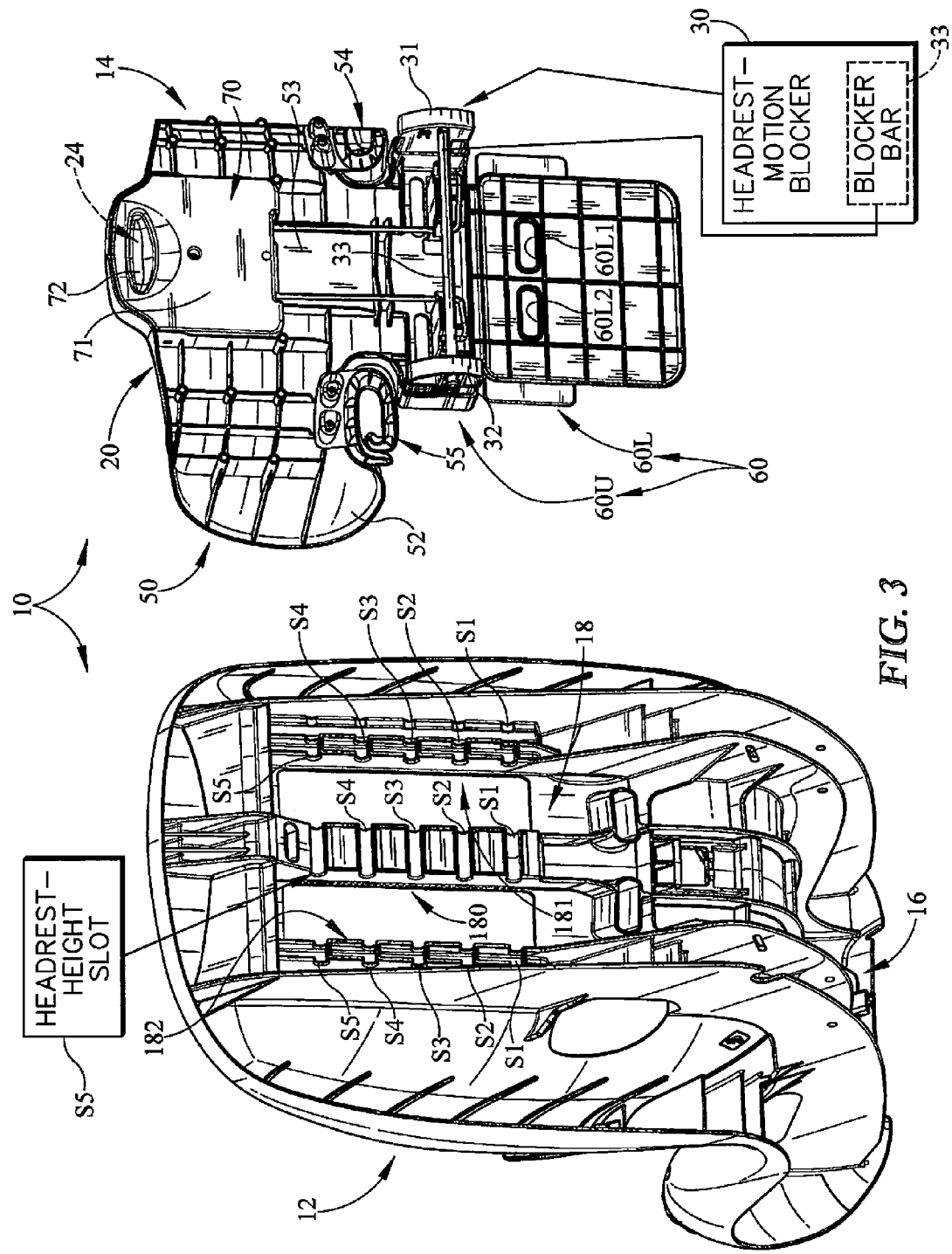

When head-restraint unit 14 is mounted on seat back 18 as suggested in FIG. 1, blocker bar 33 is urged by springs 35, 36 toward seat back 18 as suggested diagrammatically in FIG. 10 to extend into one of the headrest-height slots S1-S5 that are formed in seat back 18 as suggested in FIGS. 2 and 3. Springs 35, 36 cooperate to retain blocker bar 33 in the selected headrest-height slots to establish the headrest-locked mode of headrest-height adjustor 22 (and the HEADREST-LOCKED ENGAGED position of headrest-lock linkage 26) and retain headrest 20 in a selected stationary position on seat back 18 at a selected elevated height relative to seat bottom 16 as suggested in FIG. 1.

A blocker-bar mover 40 is also included in headrest-lock linkage 26 of headrest-height adjustor 22 as suggested in FIG. 4. Blocker-bar mover 40 includes rotatable first and second blocker-motion rods 41, 42. Each of rods 41, 42 is mounted on headrest 20 for rotation about its own axis of rotation 41A or 42A in response to pivoting movement of the pivotable actuation button 24 about horizontal pivot axis 24A from the HOME position to the ACTIVATED position. An upper portion of each blocker-motion rod 41, 42 is coupled to the pivotable actuation bottom 24 using any suitable means as suggested in FIG. 7. A lower portion of each blocker-motion rod 41, 42 is coupled to the spring-biased blocker bar 33 as suggested in FIGS. 5 and 7. Blocker-bar mover 40 provides means for moving blocker bar 33 relative to and away from seat back 18 against yieldable biasing forces applied to blocker bar 33 by springs 35, 36 to cause blocker bar 33 to exit headrest-height slots (e.g., S1-S5) formed in seat back 18 in response to rearward pivoting movement of the pivotable actuation button 24 about horizontal pivot axis 24A from a HOME position shown in FIGS. 9 and 10 to an ACTIVATED position shown in FIGS. 11 and 12 so as to move headrest-lock linkage 26 to the HEADREST-UNLOCKED DISENGAGED position to free headrest 20 for up-and-down movement on seat back 18.

Blocker-bar mover 40 cooperates with spring system 34 (e.g. springs 35, 36) in illustrative embodiments to provide means for yieldably biasing actuation button 24 normally from its ACTIVATED position shown in FIGS. 11 and 12 to its HOME position shown in FIGS. 9 and 10. In the illustrative embodiment, springs 35, 36 apply a force to move blocker bar 33 to apply rotation-inducing torque to blocker-bar mover 40 which causes a pivot-inducing torque to be applied to the pivotable actuation button 24 to urge the pivotable actuation button 24 to pivot about horizontal pivot axis 24A normally to the HOME position.

A center bar-anchor strip 180 and complementary left and right bar-anchor strips 181, 182 are included in seat back 18 as suggested in FIG. 3. Each bar-anchor strip 180-182 is formed to include a series of headrest-height slots (e.g. slots S1-S5) sized to receive a portion of blocker bar 33 therein to establish a fixed or locked position of blocker bar 33 on seat back 18 and thereby establish the headrest-locked mode of the headrest-height adjustor 22 and the HEADREST-LOCKED ENGAGED position of headrest-lock linkage 26. When the horizontally extending blocker bar 33 is aligned to confront, for example, the middle slots S3 formed in the bar-anchor strips 180-182, springs 35, 36 included in spring system 34 cooperate to urge portions of blocker bar 33 into those middle slots S3 provided in seat back 18 to block up-and-down movement of headrest 20 on seat back 18.

When front face 24F of pivotable actuation button 24 is pushed inwardly in rearward direction 11R by a caregiver 23 to move from the HOME position to the ACTIVATED position, the blocker-bar mover 40 is moved relative to bar-anchor strips 180-182 to compress the springs 35, 36 included in spring system 34 and to cause blocker bar 33 to disengage bar-anchor strips 180-182 and exit the middle headrest-height slots S3 formed therein to establish the HEADREST-UNLOCKED DISENGAGED position of headrest-lock linkage 26 so as to free headrest 20 for up-and-down movement on seat back 18. It is within the scope of this disclosure to provide seat back 18 with any suitable blocker-bar engagement member or structure.

Headrest 20 includes a head cradle 50 and a harness-control panel 60 arranged to extend below head cradle 50 as suggested in FIG. 4. Head cradle 50 is configured to support the head of a child seated in juvenile vehicle seat 12. Harness-control panel 60 is coupled to the head cradle 50 to move up and down therewith on seat back 18 and to mate with shoulder belts (not shown) included in a child-restraint harness associated with juvenile vehicle seat 12 and headrest 20.

Headrest 20 also includes rod-support means for supporting first blocker-motion rod 41 for rotation about a first rotation axis 41A during pivoting motion of the pivotable actuation button 24 about horizontal pivot axis 24A and for supporting second blocker-motion rod 42 for independent rotation about a second rotation axis 42A during pivoting motion of the pivotable actuation button 24 about horizontal pivot axis 24A. As suggested in FIG. 4, the rod-support means includes a first set of rod bearings 41U, 41L coupled to headrest 20 and configured to support first blocker-motion rod 41 for rotation about first rotation axis 41A and a second set of rod bearings 42U, 42L coupled to headrest 20 and configured to support second blocker-motion rod 42 for rotation about second rotation axis 42A. In an illustrative embodiment shown in FIG. 4, rod bearings 41U, 42U are coupled to head cradle 50 while rod bearings 41L, 42L are coupled to harness-control panel 60.

Head cradle 50 of headrest 20 includes first and second side head-support panels 51, 52 and a central head-support panel 53 arranged to lie between and interconnect side head-support panels 51, 52 as suggested in FIGS. 4, 10, and 12. Rod bearing 41U is coupled to a rear face of central head-support panel 53 and arranged to lie in close proximity to first side head-support panel 51. Rod bearing 42U is also coupled to a rear face of central head-support panel 53 and arranged to lie in close proximity to second side head-support panel 52 as suggested in FIGS. 4, 10, and 12. In an illustrative embodiment shown in FIG. 4, headrest 20 also includes first, second and central pads 51P, 52P, and 53P for mating with front faces of panels 51, 52, and 53, respectively.

Harness-control panel 60 of headrest 20 includes a lower panel section 60L and an upper panel section 60U arranged to lie between and interconnect central head-support panel 53 and upper panel section 60U as suggested in FIG. 4. Rod bearings 41L and 42L are coupled to a rear face of lower panel section 60L as suggested in FIGS. 4, 10, and 12. An upper pair of space-apart, horizontally extending, elongated belt-receiving slots 60U1, 60U2 are formed in upper panel section 60U. A lower pair of spaced-apart, horizontally extending, elongated belt-receiving slots 60L1, 60L2 are formed in lower panel section 60L. Each of slots 60U1, 60U2, 60L1, and 60L2 are sized to receive shoulder belts included in a child-restraint harness (not shown) associated with child restraint 10. Rod bearings 41L, 42L are arranged to lie in a space provided between upper belt-receiving slots 60U1, 60U2 and lower belt-receiving slots 60L1, 60L2.

Headrest 20 also includes first and second strap guides 54, 55 coupled to head cradle 50 as shown in FIGS. 2 and 3 and suggested in FIG. 4. Each strap guide 54, 55 is configured to provide a channel for receiving a portion of a shoulder strap included in a passenger vehicle.

Each of the first and second blocker-bar supports 31, 32 included in headrest-motion blocker 30 is coupled to headrest 20 to move up and down therewith relative to seat back 18 as suggested in FIG. 3. In an illustrative embodiment, upper panel section 60U of harness-control panel 60 is formed to include a first support-receiving socket 61 sized to receive first blocker-bar support 31 and a second support-receiving socket 62 arranged to lie in laterally spaced-apart relation to first support-receiving socket 61 and sized to receive second blocker-bar support 32.

First blocker-bar support 31 is formed to include a guide channel 31G sized to receive a first end of blocker bar 33 while second blocker-bar support 32 is formed to include a guide channel 32G sized to receive an opposite second end of blocker bar 33 as suggested in FIGS. 4 and 5. Blocker bar 33 is constrained to move back and forth in guide channels, 31G, 32G during movement of the spring-biased blocker bar 33 toward and away from seat back 18 as suggested in FIGS. 10 and 12.

Headrest-height adjustor 22 comprises (1) a headrest-motion blocker 30 configured to engage seat back 18 to block up-and-down movement of headrest 20 relative to seat back 18 and to disengage seat back 18 to free headrest 20 to be moved up and down on the seat back by a caregiver, (2) rotatable first and second blocker-motion rods 41, 42 supported on the headrest 20 for rotation about substantially vertical rotation axes 41A, 42A, and (3) a spring-biased pivotable actuation button 24 mounted on headrest 20 to be accessible from the front side of seat back 18 for rearward pivotable movement about a horizontal pivot axis 24A by a caregiver using only one hand to cause the first and second blocker-motion rods 41, 42 to rotate in opposite directions and apply a disengagement force to move the spring-biased headrest—motion blocker 33 in rearward direction 11R away from seat back 18 to disengage seat back 18 so that headrest 20 is free for up-and-down movement relative to seat back 18.

An illustrative rotatable first blocker-motion rod 41 included in blocker-bar mover 40 of headrest-lock linkage 26 is shown in FIGS. 4 and 6-8. First blocker-motion rod 41 includes, in series, from top to bottom, an L-shaped first torque receiver 412, a first middle journal 413, a first journal connector 414, a first lower journal 415, a first driver support 416, and an L-shaped first blocker-bar driver 417. First upper journal 413 is arranged to mate and lie in rotative bearing engagement with the first upper rod bearing 41U that is coupled to central head-support panel 53 of head cradle 50. First lower journal 415 is arranged to mate and lie in rotative bearing engagement with the first lower rod bearing 41L that is coupled to upper panel section 60U of harness-control panel 60. Rod bearings 41U and 41L are aligned with one another and cooperate to support the rotatable first blocker-motion rod 41 for rotation about the substantially vertical rotation axis 41A.

L-shaped first torque receiver 412 is arranged to mate with a portion of the pivotable actuation button 24 as suggested in FIGS. 7, 10, and 12. L-shaped first blocker bar driver 417 is arranged to mate with a portion of the blocker bar 33 as suggested in FIGS. 7, 10, and 12. In illustrative embodiments, first upper journal 413 provides an upper axle of the rotatable first blocker-motion rod 41 while first journal connector 414 and first lower journal 415 cooperate to provide a lower axle of the rotatable first blocker-motion rod 41.

An illustrative rotatable second blocker-motion rod 42 included in blocker-bar mover 40 of headrest-lock linkage 26 is shown in FIGS. 4 and 6-8. Second blocker-motion rod 42 includes, in series, from top to bottom, an L-shaped second torque receiver 422, a second middle journal 423, a second journal connector 424, a second lower journal 425, a second driver support 426, and an L-shaped second blocker-bar driver 427. Second upper journal 423 is arranged to mate and lie in rotative bearing engagement with the second upper rod bearing 42U that is coupled to central head-support panel 53 of head cradle 50. Second lower journal 425 is arranged to mate and lie in rotative bearing engagement with the second lower rod bearing 42L that is coupled to upper panel section 60U of harness-control panel 60. Rod bearings 42U and 42L are aligned with one another and cooperate to support the rotatable second blocker-motion rod 42 for rotation about the substantially vertical rotation axis 42A.

L-shaped second torque receiver 422 is arranged to mate with a portion of the pivotable actuation button 24 as suggested in FIGS. 7, 10, and 12. L-shaped second blocker bar driver 427 is arranged to mate with a portion of the blocker bar 33 as suggested in FIGS. 7, 10, and 12. In illustrative embodiments, second upper journal 423 provides an upper axle of the rotatable second blocker-motion rod 42 while second journal connector 424 and second lower journal 425 cooperate to provide a lower axle of the rotatable second blocker-motion rod 42.

Figure 6:
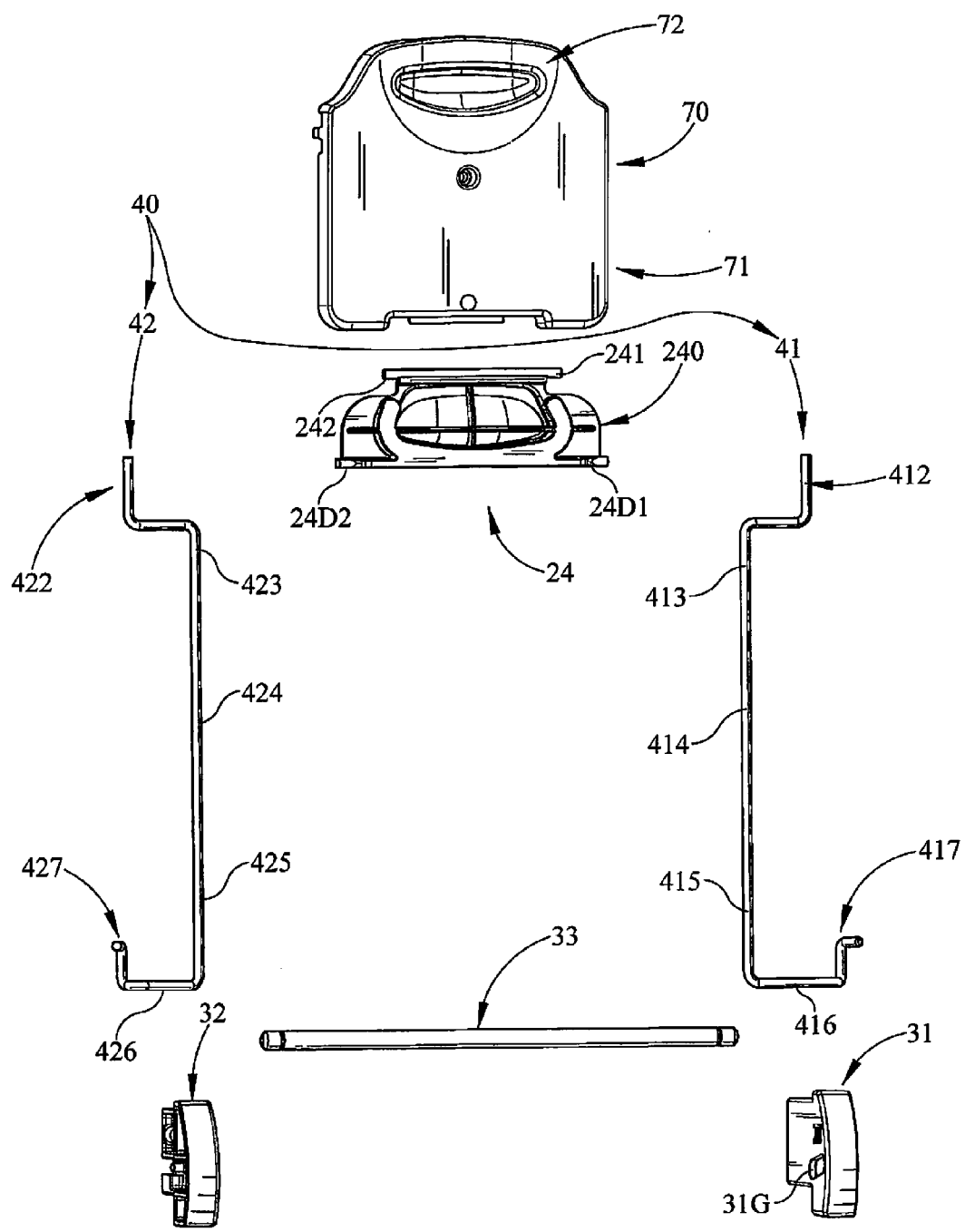
FIG. 6 is an exploded perspective assembly view of components shown in FIG. 5.

Pivotable actuation button 24 illustratively includes a finger-push plate 240 defining front face 24F and first and second button axles 241, 242 coupled to an upper portion of finger-push plate 240 and arranged to lie in spaced-apart relation to one another and extend in opposite directions as suggested in FIGS. 4 and 6. Each of button axles 241, 242 is coupled to a companion axle mount 241M or 242M provided on a rear face of central head-support panel 53 to support finger-push plate 240 for pivotable movement about horizontal pivot axis 24A as suggested in FIGS. 10 and 12.

Pivotable actuation button 24 also includes first and second rod drivers 24D1, 24D2 arranged to apply torque to the rotatable first and second blocker-motion rods 41, 42 in response to pivoting movement of finger-push plate 240 about horizontal pivot axis 24A. Rod drivers 24D1, 24D2 are coupled to a lower portion of finger-push plate 240 and arranged to lie in spaced-apart relation to one another and extend in opposite directions as suggested in FIGS. 4 and 6. First rod driver 24D1 is arranged to engage first torque receiver 412 of first blocker-motion rod 41 and to transmit torque to first torque receiver 412 (to cause first blocker-motion rod 41 to rotate about rotation axis 41A) during pivoting movement of actuation button 24 from a HOME position shown in FIGS. 9 and 10 to an ACTIVATED position shown in FIGS. 11 and 12. In illustrative embodiments, first rod driver 24D 1 and first button axle 241 are arranged to lie in spaced-apart parallel relation to one another. Second rod driver 24D2 is arranged to engage second torque receiver 422 of second blocker-motion rod 42 and transmit torque to second torque receiver 422 (to cause second blocker-motion rod 42 to rotate about rotation axis 42A) during pivoting movement of actuation button 24 from the HOME position to the ACTIVATED position.

A button-return spring (not shown) coupled to actuation button 24 could be included in headrest-height adjuster 22 in accordance with the present disclosure. Such a button-return spring could be configured and arranged to provide means for yieldably biasing actuation button 24 normally from its ACTIVATED position shown in FIGS. 11 and 12 to its HOME position shown in FIGS. 9 and 10. In illustrative embodiments, springs 35, 36 of spring system 34 function to yieldably bias headrest-lock linkage 26 to move actuation button 24 from the ACTIVATED position to the HOME position.

A rear shield 70 is also included in headrest 20 and configured to be mounted on head cradle 50 to cover and shield pivotable actuation button 24 and allow for rotation of first and second blocker-motion rods 41, 42 about rotation axes 41A, 42A as suggested in FIGS. 4 and 5. In illustrative embodiments, rear shield 70 includes a cover plate 71 and a handgrip 72 as shown, for example, in FIG. 5.

The pivotable actuation button 24 is shown in FIG. 9 to be in a normal HOME position. Blocker bar 33 of headrest-motion blocker 30 is spring-biased by springs 35, 36 of spring system 34 to extend into one of the headrest-height slots S1-S5 formed in the three bar-anchor strips 180-182 included in seat back 18 (and shown in FIG. 3) when pivotable actuation button 24 occupies the HOME position to establish the headrest-locked mode of headrest-height adjustor 22 so as to block up-and-down movement of headrest 20 on seat back 18. FIG. 10 is a rear perspective view of the head-restraint unit 14 showing the pivotable actuation button 24 in the normal HOME position and suggesting that blocker bar 33 of headrest-motion blocker 30 is engaged to seat back 18 to establish headrest-locked mode of the headrest-height adjustor 22.

The pivotable actuation button 24 is shown in FIG. 11 after it has been pivoted in a rearward direction about the horizontal pivot axis 24A against a spring force generated, for example, by springs 35, 36 to assume a temporary ACTIVATED position to move head-rest lock linkage 26 to the HEADREST-LOCKED ENGAGED position to establish the headrest-unlocked mode of headrest-height adjustor 22. FIG. 12 is a rear perspective view of the head-restraint unit 14 showing the pivotable actuation button 24 in the temporary ACTIVATED position and suggesting that the actuation button 24 has applied torque to the L-shaped torque receivers 412, 422 of each of the rotatable first and second blocker-motion rods 41, 42 to rotate those rods 41, 42 in opposite directions about companion vertical rotation axes 41A, 42A to cause the L-shaped blocker-bar drivers 417, 427 included in lower portions of the blocker-motion rods 41, 42 each to apply a disengagement force to blocker bar 33 of headrest-motion blocker 30 to disengage blocker bar 33 from the headrest-height slots formed in seat back 18 to move headrest-lock linkage 26 to the HEADREST-UNLOCKED DISENGAGED position to establish the headrest-unlocked mode of headrest-height adjustor 22. In use, the rotatable first and second blocker-motion rods 41, 42 rotate in opposite directions about their respective rotation axes 41A, 42A in response to pivoting movement of a single pivoting component (e.g., actuation button 24) centered on headrest 20 to cause rearward movement of blocker bar 33 in rearward direction 11R to disengage the headrest-height slots formed in the seat back 18.

According to the present disclosure, a child restraint 10 includes a juvenile vehicle seat 12 having a seat bottom 16 and a seat back 18 as suggested in FIGS. 1 and 2. Child restraint 10 also includes a headrest 20 mounted for up-down movement relative to seat back 18. Child restraint 10 includes a headrest-height adjustor 22 that is coupled to headrest 20 to move up and down with headrest 20 relative to seat back 18 of juvenile vehicle seat 12. Headrest-height adjustor 22 is configured to be changeable by a caregiver between a headrest-locked mode engaging seat back 18 in which headrest-lock linkage 26 is in the HEADREST-LOCKED ENGAGED position to prevent headrest 20 from moving up and down relative to seat back 18 as suggested in FIGS. 9 and 10 and a headrest-unlocked mode in which headrest-lock linkage 26 is in the HEADREST-UNLOCKED DISENGAGED position to allow headrest 20 to move up and down relative to seat back 18 as suggested in FIGS. 11 and 12.

In illustrative embodiments, a caregiver needs to use only one hand to change headrest-height adjustor 22 from the headrest-locked mode to the headrest-unlocked mode so that headrest 20 is released and can be moved up or down on seat back 18 easily. A spring-loaded actuation button 24 included in headrest-height adjustor 22 is mounted on headrest 20 to be accessed from the front side of seat back 18 for pivotable movement by the caregiver relative to headrest 20 about a substantially horizontal pivot axis 24A as suggested in FIGS. 1, 11, and 12 using only one hand to change headrest-height adjustor 22 from the headrest-locked mode to the headrest-unlocked mode.

A caregiver can easily grip a top portion of headrest 20 with the palm of one hand and pivot actuation button 24 about horizontal pivot axis 24A using the fingers of that same hand apply a motion-inducing force 23F in rearward direction 11R to a front face 24F of actuation button 24 to compress button-biasing springs 35, 36 that are also included in headrest-height adjustor 22 and are arranged to act between headrest 20 and headrest-lock linkage 26. By pivoting the actuation button 24 about horizontal pivot axis 24A rearwardly from a spring-biased normal HOME position to a pivoted ACTIVATED position, a headrest-lock linkage 26 coupled to actuation button 24 and included in headrest-height adjustor 22 is moved relative to seat back 18 to cause the headrest-height adjustor 22 to be changed from the headrest-locked mode to the headrest-unlocked mode to free headrest 20 for up-and-down movement relative to seat back 18.

Blocker bar 33 of headrest-lock linkage 26 of headrest-height adjustor 22 further includes a headrest-motion blocker 30 comprising a horizontally extending blocker bar 33 and a blocker-bar mover 40 comprising a pair of vertically extending rotatable bar-mover rods 41, 42 as suggested in FIG. 4. The rotatable bar-mover rods 41, 42 each have a lower portion coupled to blocker bar 33 of headrest-motion blocker 30 and an upper portion coupled to the pivotable actuation button 24 as suggested in FIGS. 10 and 12.

Blocker bar 33 of headrest-motion blocker 30 is arranged to face toward seat back 18 and is spring-biased to move normally toward seat back 18 to engage one of several horizontal headrest-height slots S1-S5 formed in seat back 18 to fix headrest 20 in a stationary position on seat back 18 to establish the height of headrest 20 relative to seat bottom 16. The spring-biased blocker bar 33 can be moved away from seat back 18 using blocker-bar mover 40 to disengage the headrest-height slots S1-S5 to free headrest 20 for up-and-down movement on seat back 18.

The rotatable bar-mover rod 41 of blocker-bar mover 40 is mounted on headrest 20 for rotation about a substantially vertical rotation axis 41A to cause the lower portion of rod 41 to engage blocker bar 33 of headrest-motion blocker 30. Rotation of rotatable bar-mover rod 41 about the vertical rotation axis 41A causes the spring-biased blocker bar 33 to move horizontally away from seat back 18 and out of a companion horizontal height-adjust slot S1-S5 to disengage seat back 18 and establish the headrest-unlocked mode of headrest-height adjustor 22 so that the caregiver can move headrest 20 up and down relative to seat back 18 and therefor change the height of headrest 20 relative to seat bottom 16. The rotatable bar-mover rod 42 functions in a similar manner in accordance with the present disclosure.

The pivotable actuation button 24 can be pivoted about horizontal pivot axis 24A by a caregiver using only one hand to move relative to headrest 20 and cause headrest-lock linkage 26 to move the spring-biased blocker bar 33 of headrest-motion blocker 30 in rearward direction 11R away from seat back 18 to disengage one of the horizontal height-adjust slots S1-S5. In operation, a rotation-inducing torque is applied to the upper portions of each of the rotatable bar-mover rods 41, 42 in response to pivoting movement of the pivotable actuation button 24 about the horizontal pivot axis 24A to cause each of the rotatable bar-mover rods 41, 42 to rotate about its vertical rotation axis 41A or 42A and apply a disengagement force to blocker bar 33 of headrest-motion blocker 30 that is sufficient to move blocker bar 33 away from seat back 18 to disengage one of the headrest-height slots S1-S5 formed in seat back 18 so that headrest 20 is free to be moved up or down on seat back 18 by the caregiver to a raised or lowered height.

By providing a single pivoting component such as pivotable actuation button 24 in the center of headrest 20 and using that pivotable actuation button 24 to activate and rotate separated rods 41, 42, a headrest lock bar defined by blocker bar 33 can be displaced relative to seat back 18 so as to allow the height of headrest 20 to be adjusted. This action in accordance with the present disclosure allows headrest 20 to be unlocked from a fixed position, moved to another position, and re-locked using one hand.

The invention claimed is:

1. A child restraint comprising
a juvenile vehicle seat including a seat back and a seat bottom arranged to extend in a forward direction away from the seat back, and
a head-restraint unit including a headrest mounted for up-and-down movement on the seat back and formed to include a forward-opening aperture and a headrest-height adjustor having a headrest-locked mode engaging the seat back to prevent the headrest from moving up and down relative to the seat back and a headrest-unlocked mode disengaging the seat back to allow the headrest to move up and down relative to the seat back and mode-changer means for changing the headrest-height adjustor means from the headrest-locked mode to the headrest-unlocked mode in response to movement of an external force generator through the forward-opening aperture formed in the headrest in an opposite rearward direction.

2. The child restraint of claim 1, wherein the headrest includes a front surface facing in the forward direction and a rear surface facing in the opposite rearward direction, the mode-changer means includes an actuation button arranged to face toward the rear surface of the headrest and exposed in the forward-opening aperture to engage the external force generator as the external force generator moves through the forward-opening aperture in the opposite rearward direction and a headrest-lock linkage coupled to the actuation button to move therewith relative to the headrest in response to application of a movement-inducing force to the actuation button by the external force generator, and the headrest-lock linkage is arranged normally to engage the seat back to block up-and-down movement of the headrest relative to the seat back and to disengage the seat back to free the headrest for up-and-down movement relative to the seat back in response to movement of the external force generator through the forward-facing aperture in the opposite rearward direction to apply the movement-inducing force to the actuation button.

3. The child restraint of claim 2, wherein the actuation button is mounted on the rear side of the headrest for pivotable movement about a horizontal pivot axis toward and away from the rear side of the headrest and the headrest-height adjustor further includes a spring system arranged to apply a biasing force to the headrest-lock linkage to urge the actuation button to pivot about the horizontal pivot axis normally to a home position associated with the headrest-locked mode of the headrest-height adjustor and exposed in the forward-opening aperture to receive a movement-inducing force applied by the external force generator.

4. The child restraint of claim 3, wherein the actuation button includes a finger-push plate arranged to lie adjacent the rear surface of the headrest to close the forward-opening aperture formed in the headrest upon arrival of the actuation button at the home position and a button axle coupled to the finger-push plate and to the headrest to support the finger-push plate for pivotable movement about the horizontal pivot axis.

5. The child restraint of claim 2, wherein the headrest-lock linkage includes a blocker bar that is arranged to lie along the rear side of the headrest and face toward the seat back and is spring-biased to move normally toward the seat back to engage one of several headrest-height slots formed in the seat back to fix the headrest in a stationary position on the seat back to establish the height of the headrest relative to the seat bottom, the headrest-lock linkage further includes a vertically extending rotatable bar-mover rod having a lower portion coupled to the blocker bar and an upper portion coupled to the actuation button, and the vertically extending rotatable bar-mover rod is mounted on the headrest for rotation about a rotation axis to cause the lower portion of the vertically extending rotatable bar-mover rod to engage the blocker bar and cause the blocker bar to move away from the seat back and out of a horizontal height-adjust slot to disengage the seat back and establish the headrest-unlocked mode of the headrest-height adjustor so that a caregiver can move the headrest up and down relative to the seat back and therefor change the height of the headrest relative to the seat bottom.

6. The child restraint of claim 5, wherein the vertically extending rotatable bar-mover rod includes a torque receiver coupled to the actuation button and a blocker-bar driver coupled to the blocker bar and the torque receiver is arranged to receive a rotation-inducing torque applied by the actuation button in response to pivoting movement of the actuation button about the horizontal pivot axis to cause the vertically extending rotatable bar-mover rod to rotate about the rotation axis and apply a disengagement force to the blocker bar sufficient to move the blocker bar away from the seat back so that the headrest is free to be moved up and down on the seat back by a caregiver to a raised or lowered height.

7. The child restraint of claim 6, wherein the headrest includes a head cradle configured to support the head of a child seated in the juvenile vehicle seat and a rod bearing coupled to the head cradle and configured to support the vertically extending rotatable bar-mover rod for rotation about the rotation axis.

8. The child restraint of claim 7, wherein the headrest further includes a harness-control panel arranged to extend downwardly below the head cradle and coupled to the head cradle to move up and down therewith on the seat back and to mate with shoulder belts included in a child-restraint harness associated with the juvenile vehicle seat and the headrest and another rod bearing coupled to the harness-control panel and configured to support the vertically extending rotatable bar-mover rod for rotation about the rotation axis.

9. The child restraint of claim 6, wherein the headrest-lock linkage further includes a first blocker-bar support formed to include a first guide channel receiving a first end of the blocker bar therein and a second blocker-bar support formed to include a second guide channel receiving an opposite second end of the blocker bar therein, the blocker bar is constrained to move back and forth in the first and second guide channels during movement of the blocker bar relative to the seat back, each of the first and second blocker-bar supports is coupled to the headrest to move up and down therewith relative to the seat back, and a bar-return spring system including a first spring associated with the first blocker-bar support and the first end of the blocker bar and a second spring associated with the second blocker-bar support and the second end of the blocker bar.

10. The child restraint of claim 6, wherein the headrest is configured to mate in a rotative bearing engagement with a journal included in the vertically extending rotatable bar-mover rod and located between the torque receiver and the blocker-bar driver to support the vertically extending rotatable bar-mover rod for rotation about the rotation axis and the blocker-bar driver includes an L-shaped blocker-bar driver arranged to engage the blocker bar and a first driver support arranged to interconnect the journal and the L-shaped blocker-bar driver and oriented to lie in perpendicular relation to the journal.

11. A child restraint comprising
a juvenile vehicle seat including a seat back and
a head-restraint unit including a headrest mounted for up-and-down movement on the seat back and a headrest-height adjustor coupled to the headrest for up and-down movement therewith relative to the seat back, the headrest-height adjustor including a pivotable actuation button mounted on the headrest and extending forward relative to a front face of the seat back for pivotable movement relative to the headrest about a substantially horizontal pivot axis in response to exposure of a front face included in the pivotable actuation button and arranged to face away from the seat back to an external force applied in a direction toward the seat back to cause movement of a headrest-lock linkage included in the headrest-height adjustor from a headrest-locked engaged position engaging the seat back to prevent the headrest from moving up and down on the seat back to a headrest-unlocked disengaged position disengaging the seat back to allow up-and-down movement of the headrest relative to the seat back.

12. The child restraint of claim 11, wherein the headrest includes an upwardly facing top position and the pivotable actuation button includes a finger-push plate defining the front face and first and second button axles coupled to an upper portion of the finger-push plate and arranged to lie between the upwardly facing top portion of the headrest and the underlying finger-push plate.

13. The child restraint of claim 12, wherein the headrest includes first and second side head-support panels and a central head-support panel arranged to lie in between and interconnect the first and second side head-support panels, and each of the first and second button axles is coupled to a companion axle mount provided on a rear face of the central head-support panel to locate the first and second button axles between the central head-support panel and the seat back and to support the finger-push plate for pivotable movement about the substantially horizontal pivot axis.

14. The child restraint of claim 13, wherein the central head-support panel is formed to include a forward-facing aperture and the finger-push plate of the pivotable actuation button is exposed in the forward-facing aperture and arranged to lie in a button-receiving space provided between the central head-support panel and the seat back, and the pivotable actuation button is arranged to pivot in the button-receiving space about the substantially horizontal pivot axis in response to movement of an external force generator in a rearward direction through the forward-facing aperture to engage the finger-push plate of the pivotable actuation button from a normal home position associated with the headrest-locked engaged position of the headrest-lock linkage to a temporary activated position associated with the headrest-unlocked disengaged position of the headrest-lock linkage.

15. The child restraint of claim 12, wherein the pivotable actuation button further includes first and second rod drivers arranged to apply torque to cause movement of the headrest-lock linkage from the headrest-lock engaged position to the headrest-unlocked disengaged position during pivotable movement of the pivotable actuation button about the substantially horizontal pivot axis from a normal home position associated with the headrest-locked position of the headrest-lock linkage to a temporary activated position associated with the headrest-unlocked disengaged position of the headrest-lock linkage.

16. The child restraint of claim 15, wherein the headrest-height adjustor includes a headrest-motion blocker configured to engage the seat back when the pivotable actuation button is in the normal home position to block up-and-down movement of the headrest relative to the seat back, a rotatable first blocker-motion rod arranged to mate with the first rod driver included in the pivotable actuation button and supported on the headrest for rotation in a first direction about a substantially vertical first rotation axis in response to pivotable movement of the pivotable actuation button from the normal home position to the temporary actuated position, and a rotatable second blocker-motion road arranged to mate with the second rod driver included in the pivotable actuation button and supported on the headrest for rotation in an opposite second direction about a substantially vertical second rotation axis in response to pivotable movement of the pivotable actuation button form the normal home position to the temporary activated position, and wherein the headrest-motion blocker is arranged to mate with an L-shaped first blocker-bar driver included in the rotatable first blocker-motion rod and with an L-shaped second blocker-bar driver included in the rotatable second blocker-motion rod and to move from an engaged position in engagement with the seat back to block up-and-down movement of the headrest relative to the seat back to a disengaged position disengaged from the seat back to allow up-and-down movement of the headrest relative to the seat back in response to pivotable movement of the pivotable actuation button from the normal home position to the temporary activated position.

* * * * *